United States Patent
Yun et al.

(10) Patent No.: US 10,057,643 B2
(45) Date of Patent: Aug. 21, 2018

(54) UPNP COMMUNICATION SYSTEM AND METHOD FOR ACTIVE STANDBY MODE

(71) Applicant: Korea Electronics Technology Institute, Seongnam-si, Gyeonggi-do (KR)

(72) Inventors: Jung Mee Yun, Seongnam-si (KR); Sang Hak Lee, Seongnam-si (KR); Suk In Kang, Suwon-si (KR)

(73) Assignee: Korea Electronics Technology Institute, Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/194,564

(22) Filed: Jun. 28, 2016

(65) Prior Publication Data

US 2017/0064387 A1    Mar. 2, 2017

(30) Foreign Application Priority Data

Aug. 27, 2015   (KR) .................. 10-2015-0120729

(51) Int. Cl.
*H04N 21/443* (2011.01)
*H04N 21/436* (2011.01)

(52) U.S. Cl.
CPC ... *H04N 21/4436* (2013.01); *H04N 21/43615* (2013.01)

(58) Field of Classification Search
CPC ......... H04B 2203/5429; H04N 21/436; H04N 21/43607; H04N 21/43615; H04N 21/43622; H04N 21/4363; H04N 21/43632; H04N 21/43635; H04N 21/43637; H04N 21/4367; H04N 21/4436
See application file for complete search history.

(56) References Cited

U.S. PATENT DOCUMENTS

| | | | |
|---|---|---|---|
| 8,860,890 B2 * | 10/2014 | Jang .................. | H04N 5/63 348/14.03 |
| 2011/0162018 A1 * | 6/2011 | Dodd ................ | H04N 21/4333 725/78 |
| 2012/0166594 A1 * | 6/2012 | Yuasa ................ | H04L 12/2812 709/219 |

(Continued)

FOREIGN PATENT DOCUMENTS

KR   10-2013-0122923 A   11/2013

OTHER PUBLICATIONS

Korean Office Action dated Jul. 25, 2016 in connection with the counterpart Korean Patent Application No. 10-2015-0120729.

(Continued)

*Primary Examiner* — Benjamin R Bruckart
*Assistant Examiner* — Anthony Bantamoi
(74) *Attorney, Agent, or Firm* — Hauptman Ham, LLP

(57) ABSTRACT

An UPnP communication system and method for supporting an active standby mode is provided. A media system according to exemplary embodiments includes: a player configured to play back media in an active mode; and a processor configured to provide device information of the player to a controller in a standby mode, and activate the player when the controller requests playback of media. Accordingly, the fewest renderers excluding media playback are operated, so that media can be played back according to a request from the controller even when a media renderer enters a low-power mode.

4 Claims, 5 Drawing Sheets

(56) References Cited

U.S. PATENT DOCUMENTS

2014/0143575 A1* 5/2014 Ansley .............. H04W 52/0235
  713/323

OTHER PUBLICATIONS

"Protocols for Low Power Communication between Smart Appliances", Jun. 23, 2015 , TTAK_KO_06_0199, 20 pages.
Korean Office Action dated Feb. 22, 2016 corresponding to Korean Application No. 10-2015-0120740.

* cited by examiner

| Devices | Roles |
|---|---|
| Media Renderer (DMR/DMP) | The media renderer serves to play back media. When a playback request is received from a media controller, the media renderer receives media from a media server and plays back the media. The media renderer supports a media format provided by the DLNA and media playback functions such as stop, fast forward, rewind, etc. When the media renderer is provided with both the media playback function and the function of the media controller, the media renderer is distinguished as a Digital Media Player (DMP). |
| Media Controller (DMC/M-DMC) | The media controller contains a list of devices constituting a home network and a list of media stored in the media server, and provides an interface for allowing a user to input a playback command. When the user inputs a media playback command, the media controller delivers the command to the media renderer. The media controller may be divided into a DMC and a Mobile-DMC (M-DMC) according to a communication method of a device. |
| Media Server (DMS) | The media server is a device which stores and transmits media contents. The media server provides a list of corresponding media contents to the media controller, and transmits a content stream to the media renderer when media is played back. |
| Micro Renderer | The micro renderer is a low-power small device which operates when the media renderer enters an active standby mode, and provides device information of the media renderer to the media controller and activates the media renderer when the media controller requests playback of media. The micro renderer is not provided with a media playback function and thus does not communicate with the media server. |

FIG.2

| Requirements | Standards |
|---|---|
| Network Interface | The same interface as that of the media renderer is used (refer to wired/wireless interfaces interfaces defined in the DLAN standard). |
| Network Address | The IP address of the media renderer is equally applied. |
| Wake-up interrupt | The active standby mode interface of the media renderer is used. |
| Application Protocol Standard | SSDP, SOAP, HTTP are supported. |
| Transmission Standard | TCP, UDP (Multicast) over IPv4 |
| DLAN Device /Service Explanation | The same XML standard as that of the media renderer is supported (synchronize through an internal interface of the media renderer). |

FIG.4

| Protocol | Message Standards | | Micro Renderer Standards |
|---|---|---|---|
| SSDP (UDP/IP) | NOTIFY | ssdp:alive | Required (Send/Receive) |
| | | ssdp:byebye | Optional |
| | | ssdp:update | Optional |
| | M-SEARCH | ssdp:discover | Required (Receive) |
| | HTTP/1.1 200 OK | | Required (Send) (Response for M-SEARCH) |
| HTTP (TCP/IP) | HTTP GET | | Required (Receive) |
| | HTTP /1.1 200 OK | XML | Required (Send) (Response for HTTP GET) |
| SOAP/HTTP (TCP/IP) | HTTP POST | SOAP action | Required (Receive) |
| | HTTP / SOAP Response | | Optional (within 30 seconds) |
| ZENA/HTTP (TCP/IP) | Subscribe/Unsubscribe, Event | | Not Required |

FIG.5

UPNP COMMUNICATION SYSTEM AND METHOD FOR ACTIVE STANDBY MODE

PRIORITY

The present application claims the benefit under 35 U.S.C. § 119(a) to a Korean patent application filed in the Korean Intellectual Property Office on Aug. 27, 2015, and assigned Serial No. 10-2015-0120729, the entire disclosure of which is hereby incorporated by reference.

TECHNICAL FIELD OF THE INVENTION

The present invention relates generally to a communication system and method, and more particularly, to a communication system and method for supporting a standby mode.

BACKGROUND OF THE INVENTION

Digital Living Network Alliance (DLNA) is a group which was established to provide an interoperability framework between home network devices. Products which are designed according to the DLNA guidelines can share media contents, such as music, photos, videos, etc., with one another through a home network.

Current media devices provided with the DLNA function have no solution to reduce energy consumption. Therefore, there is a demand for a method for reducing national energy consumption by reducing power consumption in media sharing services which are key technology of the content market.

SUMMARY OF THE INVENTION

To address the above-discussed deficiencies of the prior art, it is a primary aspect of the present invention to provide a media renderer system which operates the fewest renderers, except for media playback, so that media can be played back according to a request from a controller even when a media renderer enters a low-power mode.

According to one aspect of the present invention, a media system includes: a player configured to play back media in an active mode; and a processor configured to provide device information of the player to a controller in a standby mode, and activate the player when the controller requests playback of media.

Only one of the player and the processor may be in an activation state.

The processor may not perform a media playback function.

The player may be configured to receive media from a media server and play the media, and the processor may not communicate with the media server.

The controller may be configured to recognize the player and the processor as a single renderer.

The processor may use a same network interface and a same network address as those of the player.

The media system may be configured to play back media in a home network environment of a DLNA standard.

According to another aspect of the present invention, a media playback method include: playing back, by a player, media in an active mode; providing, by a processor, device information of the player to a controller in a standby mode; and, when a media playback request is received from the controller, activating, by the processor, the player.

According to exemplary embodiments of the present invention described above, the fewest renderers excluding media playback are operated, so that media can be played back according to a request from the controller even when a media renderer enters a low-power mode.

In addition, according to exemplary embodiments of the present invention, the player automatically enters a low-power mode when the player is not used to reduce energy consumption, and enters an on mode (active mode) on time according to a request of a user and can play back media.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a view showing devices forming the media renderer system and their functions;

FIG. 4 is a view showing system standards and requirements of the media renderer system; and FIG. 5 is a view showing network function requirements that the MR should satisfy from among the protocol stacks of a digital media renderer (DMR).

DETAILED DESCRIPTION OF THE INVENTION

Figure 1:
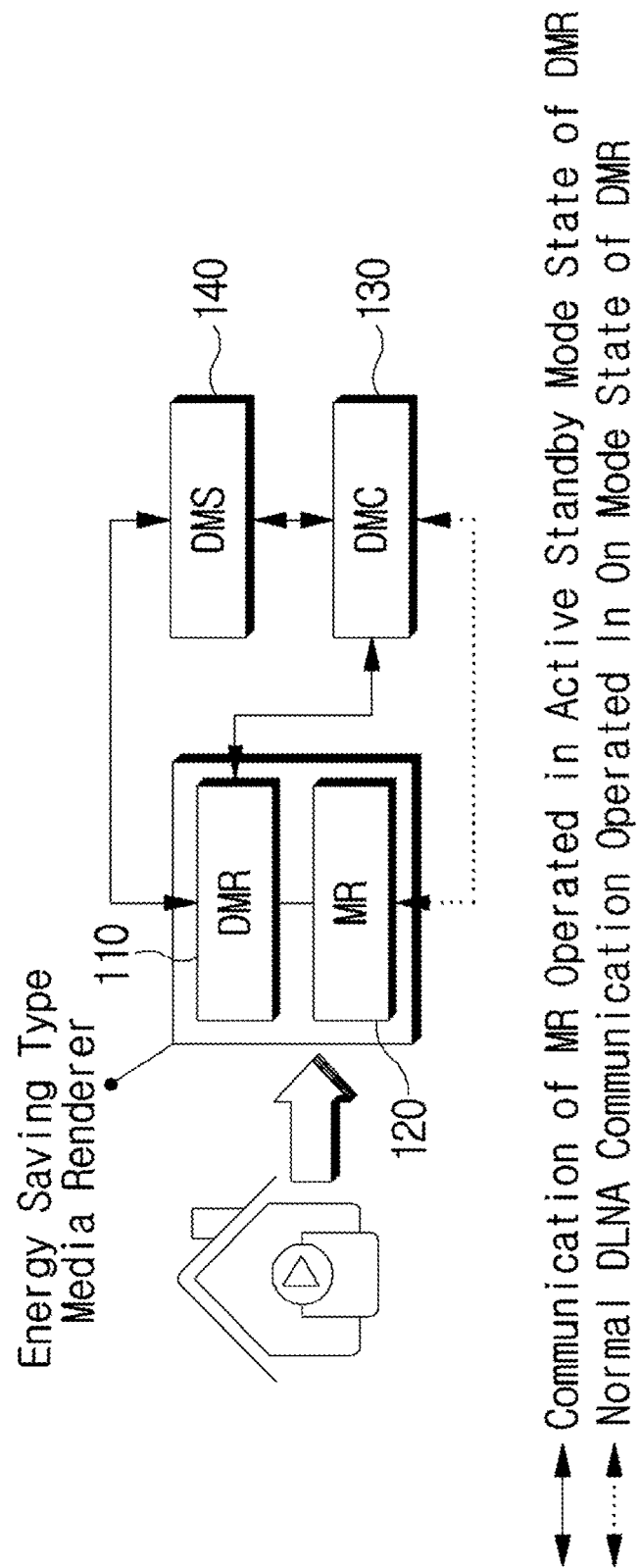
FIG. 1 is a view showing a media renderer system to which the present invention is applicable.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

1. Energy Saving Type Media Renderer System

Exemplary embodiments of the present invention provide a function, a network interface, a message standard, and a protocol stack for implementing an energy saving type media renderer system provided with a hot standby low-power communication interface.

The media renderer system to which the present invention is applicable includes a "hot standby low-power device" for activating a service of a digital media renderer of a household, in which a Universal Plug and Play (UPnP)/Digital Living Network Alliance (DLNA) is installed, when the digital media renderer enters an active standby mode to reduce energy consumption. The "hot standby low-power device" will be referred to as a "micro renderer," hereinafter.

The micro renderer does not include a media playback function and is connected with a digital media controller in the household to maintain state information of a media device.

FIG. 1 is a view showing a media renderer system to which the present invention is applicable, and FIG. 2 is a view showing devices forming the media renderer system and their functions.

As shown in FIG. 1, the media renderer system includes a Digital Media Renderer (DMR) 110, a Micro Renderer (MR) 120, a Digital Media Controller (DMC) 130, and a Digital Media Server (DMS) 140.

The DMR 110 is a player which serves to play back media. When a playback request is received from the DMC 130, the DMR 110 receives media from the DMS 140 and plays back the media. The DMR 110 supports a media format provided by the DLNA and media playback functions such as stop, fast forward, rewind, etc. When the DMR 110 is provided with both the media playback function and the function of the DMC 130, the DMR 110 may be distinguished as a Digital Media Player (DMP).

The DMC 130 contains a list of devices constituting a home network and a list of media stored in the DMS 140, and provides an interface for allowing a user to input a playback command. When the user inputs a media playback command, the DMC 130 delivers the command to the DMR 110. In the case of a mobile type, the DMC 130 may be distinguished as a Mobile-DMC (M-DMC).

The DMS 140 is a device which stores and transmits media contents. The DMS 140 provides a list of corresponding media contents to the DMC 130, and transmits a content stream to the DMR 110 when media is played back.

The MR 120 is a low-power small device which operates when the DMR 110 enters an active standby mode, and is a small processor which provides device information of the DMR 110 to the DMC 130, and activates the DMR 110 when the DMC 130 requests playback of media. The MR 120 is not provided with a media playback function and thus does not communicate with the DMS 140.

Hereinafter, the role and function of the MR 120 will be explained in detail.

2. Role and Function of Micro Renderer (MR)

The MR 120 is a device for minimizing power consumption of the DMR 110 which is a media playback device of DLNA. When the DMR 110 switches to a standby mode state to minimize power consumption, the MR 120 is activated and operates on behalf of the DMR 110, and activates the DMR 110 upon receiving a media playback request from the DMC 130.

The MR 120 is a low-power device which serves the role of the DMR 110 which is in an active standby mode. The MR 120 and the DMR 110 should be recognized as a single device rather than two separate devices in order to provide clarity to the DMC 130. Accordingly, the MR 120 provides a function of using a network interface of the DMR 110, and a function of communicating with the DMC 130.

Only one of the DMR 110 and the MR 120 is activated. That is, when the DMR 110 is in the activation mode state, the MR 120 does not communicate. To the contrary, when the DMR 110 is in the active standby mode state, the MR 120 is activated and keeps communicating with the DMC 130 on the same LAN.

Figure 3:
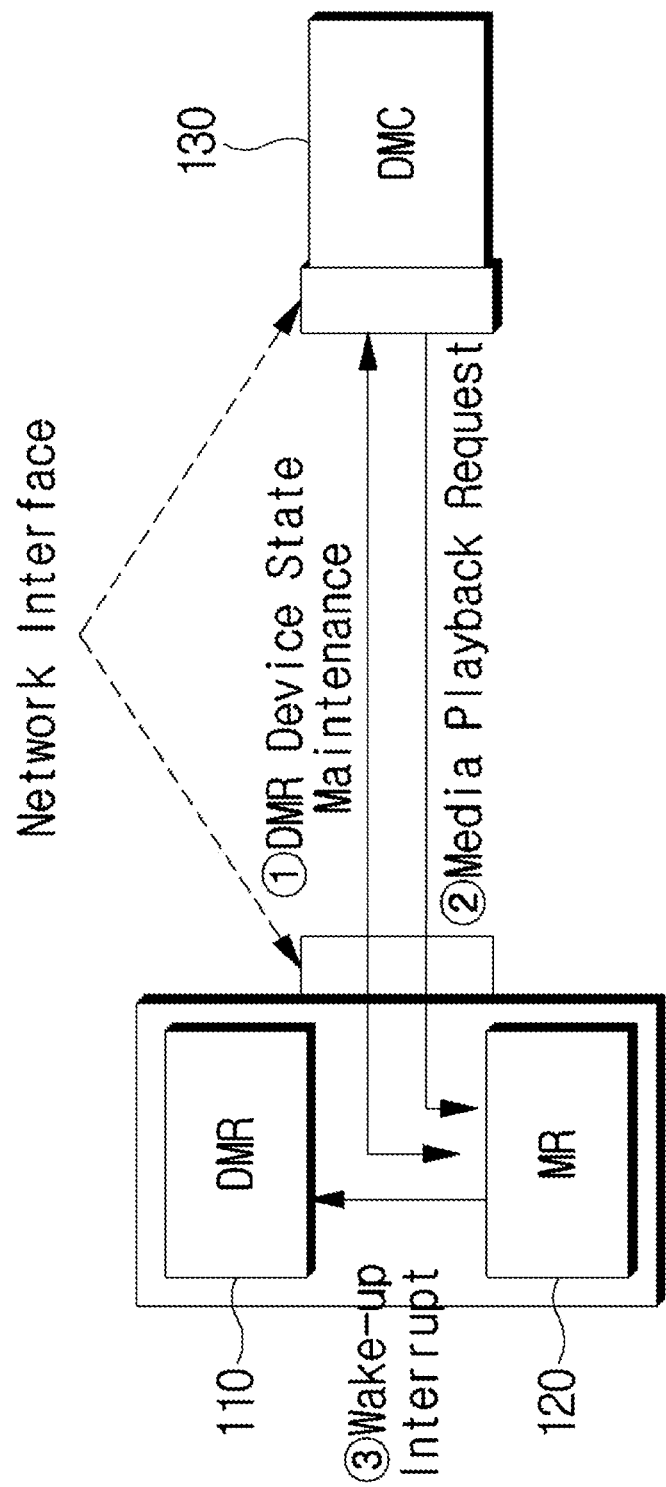
FIG. 3 is a view showing an operation of a micro renderer (MR)

The operating process of the MR 120 is divided into three steps as shown in FIG. 3, and the MR 120 communicates through the same interface as that of the DMR 110.

① DMR Device State Maintenance

The MR 120 maintains the device state of the DMR 110 using a Simple Service Description Protocol (SSDP) of UPnP and HTTP GET. The SSDP of the UPnP will be explained in detail below.

② Media Playback Request

The DMC 130 requests playback of media using a Simple Object Access Protocol (SOAP) message of the UPnP. The SOAP protocol will be explained in detail below.

③ Wake-Up Interrupt

When receiving a media playback request, the MR 120 generates a wake-up interrupt to activate the DMR 110. The interrupt may be performed through an internal interface device.

3. Standards and Requirements of System

FIG. 4 illustrates the standards and the requirements of the media renderer system. Two devices (the DMR 110 and the MR 120) should be recognized as a single logic device for the DMC 130.

Accordingly, the MR 120 keeps communicating using the same network interface as that of the DMR 110, and uses the same network address, thereby providing clarity to the DMC 130. That is, the DMC 130 performs the same operation regardless of whether the MR 120 exists or not.

In addition, the MR 120 uses the active standby mode interface of the DMR 110 to generate the wake-up interrupt, supports the SSDP, SOAP, HTTP as application protocols, and supports TCP, UPD (Multicast) over IPv4 as transmission standards.

In addition, the MR 120 supports the same XML standard as the DMR 110 and synchronizes through an internal interface of the DMR 110.

4. Network Standards

The MR 120 should provide a device explanation and a service explanation of the DMR 110 to the DMC 130 while the DMR 110 is in the active standby mode. The protocol stack supports the standard of the UPnP Device Architecture 2.0, and required functions that the MR 120 should support are as follows:

4.1 UPnP Protocol Stacks

FIG. 5 illustrates network function requirements that the MR 120 should satisfy from among the protocol stacks that the DMR 110 should have.

4.2 Required Functions 4.2.1 Required Function for Maintaining Device State

The MR 120 provides detailed information of the DMR 110, such as a device explanation, network connection, attributes, etc., to the DMC 130 while the DMR 110 is in the active standby mode. The MR 120 may use application protocols such as an SSDP or HTTP, and a transmission and network layer protocol, such as UDP or TCP and IP.

4.2.1.1 SSDP Message Standard

An ssdp:alive message is delivered according to a UDP multicast communication method of the HTTP standard. A receiver address and a port number of multicast are fixed as 239.255.255.250:1900, and the ssdp:alive message is multicasted at regular intervals. The message must be retransmitted before time described on a CACHE-CONTROL field of the message expires, and a value of the CACHE-CONTROL field is set to be longer than or equal to 30 minutes (1800 seconds).

Since the MR 120 is operated during the active standby mode of the DMR 110, the MR 120 does not directly remove a device or make a change (ssdp:byebye and ssdp:update are not included in the required functions). The MR 120 may respond to a request of M-SEARCH for searching a specific device from the DMC 130 in the HTTP method.

4.2.1.2. HTTP Message Standard for Detailed Device/Service Explanation

The DMC 130 collects device information through the SSPD and then requests detailed information related to a device and a service in an HTTP GET method. In response to this request, the MR 120 transmits device information of the HTTP and XML standards.

Media Render which is device information indicating the DMR 110, and AV Transport, Connection Manager, Rendering Control, which are service information, should be provided (an accessible URL). Although the service of the MR 120 requires only Connection Manager, all services for informing the DMC 130 of the functions of the DMR 110 should be defined.

4.2.2 SOAP Message Standard for Media Request

The DMC 130 delivers a media playback request to the DMR 110 through an SOAP action. The MR 120 is not provided with the playback function and thus the SOAP is not a required standard for the MR 120. However, the SOAP is a standard which should be provided to determine time to wake up the DMR 110. Upon receiving a message of the SOAP delivered in the HTTP POST method, the MR 120 transmits a wake-up message to the DMR 110 and stops the network function.

A response to the SOAP action should be made within 30 seconds. Therefore, the MR 120 may respond to the action request on behalf of the DMR 110 for a fast response.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A media system comprising:
    a media renderer comprising a network interface, that communicates with a media server and a media controller through the network interface and plays back media stored in the media server in an active mode; and
    a micro renderer connected with the media renderer that maintains device information of the media renderer, provides, via the network interface, the maintained device information of the media renderer to the media controller while the media renderer is in a standby mode, and activates the media renderer into the active mode so as to play back the media when the media controller requests play back of the media via the network interface,
    wherein the micro renderer is free of a media playback function,
    wherein the micro renderer is free of communication function with the media server,
    wherein the micro renderer is in a standby state while the media renderer is in activation state,
    wherein the maintained device information of the media renderer comprises a device explanation, network connection and attributes,
    wherein the media renderer receives, via a network, the media from the media server and plays back the received media, and
    wherein the media renderer plays back the media in a home network environment of a Digital Living Network Alliance (DLNA) standard.

2. The media system of claim 1, wherein the media renderer and micro renderer are recognized by the media controller as a single renderer.

3. The media system of claim 1, wherein the media renderer and micro renderer have a same network address.

4. A media playback method, the method performed by a media system comprising a media renderer for playing back media, a network interface and a micro renderer connected with the media renderer and maintained device information of the media renderer, the method comprising:
    providing, by a micro renderer through the network interface unit, the maintained device information of the media renderer to a media controller while the media renderer is in a standby mode; and
    when a media playback request is received from the media controller, activating, by the micro renderer, the media player into an active mode;
    playing back, by the media player through the network interface, media stored in a media server,
    wherein the micro renderer is free of a media playback function,
    wherein the micro renderer is free of communication function with the media server,
    wherein the micro renderer is in a standby state while the media renderer is in an activation state,
    wherein the maintained device information of the media renderer comprises a device explanation, network connection and attributes,
    wherein the media renderer receives, via a network, the media from the media server and plays back the received media, and
    wherein the media renderer plays back the media in a home network environment of a Digital Living Network Alliance (DLNA) standard.

* * * * *